(12) United States Patent
Judet et al.

(10) Patent No.: US 10,113,480 B2
(45) Date of Patent: Oct. 30, 2018

(54) TRUNNION FOR HIGH-PRESSURE TURBINE, AND TURBOJET ENGINE INCLUDING SUCH A TRUNNION

(71) Applicant: SNECMA, Paris (FR)

(72) Inventors: Maurice Guy Judet, Moissy-Cramayel (FR); Laurent Jacques Michel Coulombeau, Moissy-Cramayel (FR); Fabrice Garin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 273 days.

(21) Appl. No.: 14/897,607

(22) PCT Filed: Jun. 11, 2014

(86) PCT No.: PCT/FR2014/051420
§ 371 (c)(1),
(2) Date: Dec. 10, 2015

(87) PCT Pub. No.: WO2014/199083
PCT Pub. Date: Dec. 18, 2014

(65) Prior Publication Data
US 2016/0186656 A1 Jun. 30, 2016

(30) Foreign Application Priority Data

Jun. 12, 2013 (FR) .................... 13 55443

(51) Int. Cl.
*F01D 25/18* (2006.01)
*F02C 3/06* (2006.01)
(Continued)

(52) U.S. Cl.
CPC ............ *F02C 3/064* (2013.01); *F01D 25/183* (2013.01); *F02C 7/06* (2013.01); *F02C 7/20* (2013.01);
(Continued)

(58) Field of Classification Search
CPC ........ F01D 25/16; F01D 25/18; F01D 25/183; F01D 11/003; F01D 11/02; F02C 7/06;
(Continued)

(56) References Cited

U.S. PATENT DOCUMENTS

| 7,334,982 B2 * | 2/2008 | Singh .................... F01D 25/183 |
| | | 415/111 |
| 2008/0063333 A1 | 3/2008 | Bruno et al. |
| 2013/0069313 A1* | 3/2013 | Sonokawa ............ F01D 11/003 |
| | | 277/300 |

FOREIGN PATENT DOCUMENTS

| EP | 1724445 | 11/2006 |
| EP | 2090764 | 8/2009 |
| FR | 2957976 | 9/2011 |

OTHER PUBLICATIONS

International Search Report with English Language Translation, dated Jul. 21, 2014, Application No. PCT/FR2014/051420.
(Continued)

*Primary Examiner* — Jason Shanske
*Assistant Examiner* — Behnoush Haghighian
(74) *Attorney, Agent, or Firm* — Womble Bond Dickinson (US) LLP

(57) ABSTRACT

The invention relates to a trunnion (23) for a high-pressure turbine (11), to be arranged between a shaft of a low-pressure turbine (9) and an inner surface (34) of a seal mounting (26) of the low-pressure turbine (8), the trunnion (23) being characterized in that it includes a drop-launching extension (32) arranged such as to extend opposite a flared portion (33) of the inner surface (34) of the seal mounting (26), such that when the trunnion (23) is rotated about the shaft of the low-pressure turbine (9), oil (H2), which tends to penetrate between the trunnion (23) and the seal mounting (26), is thrown by centrifugal effect from the drop-launching
(Continued)

Figure 1:
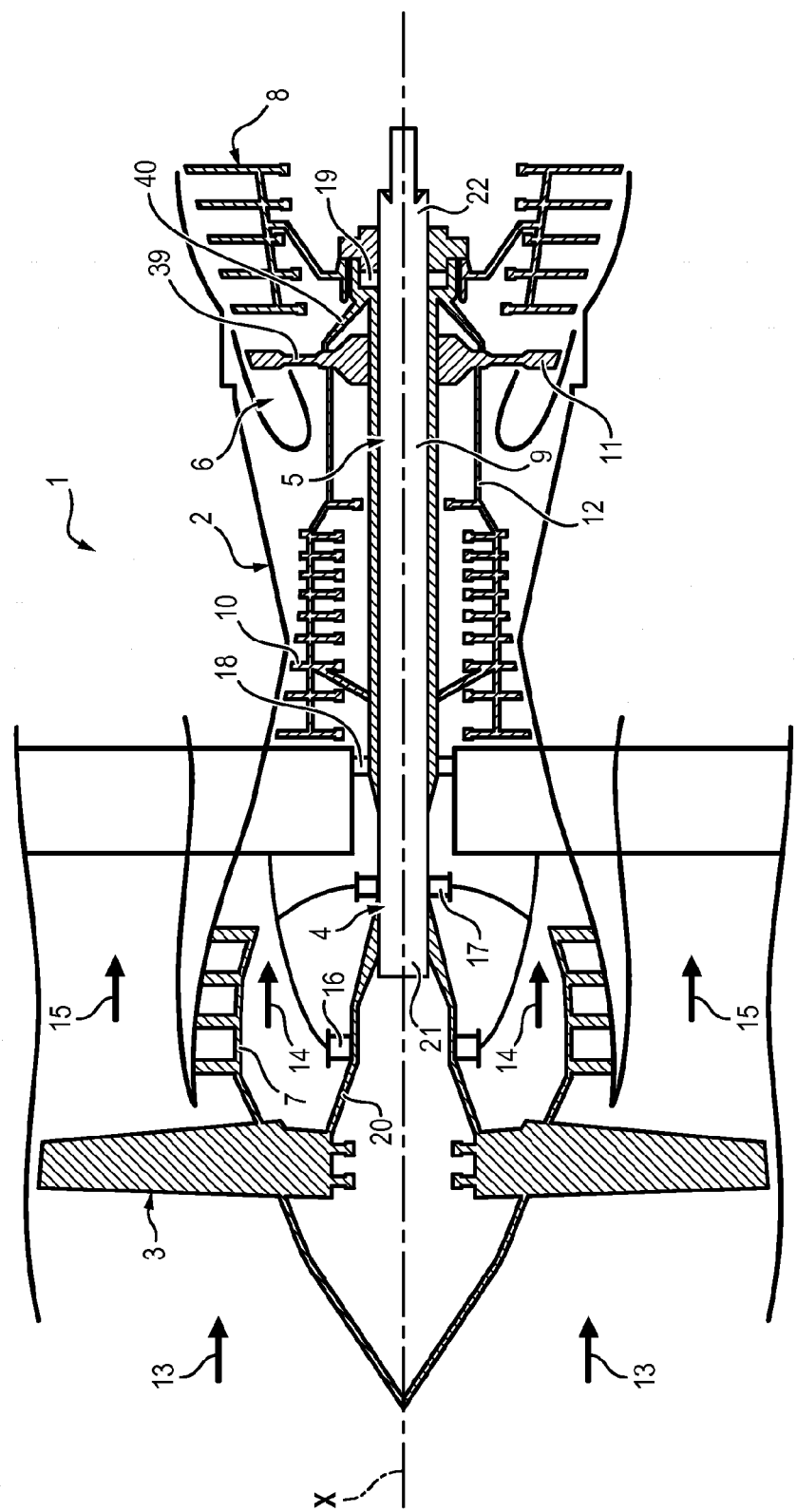

extension (32) toward the flared portion (33) of the inner surface (34) of the seal mounting (26).

4 Claims, 4 Drawing Sheets

(51) Int. Cl.
  *F02C 7/28*   (2006.01)
  *F02C 7/06*   (2006.01)
  *F02C 7/20*   (2006.01)
  *F01D 25/16*  (2006.01)

(52) U.S. Cl.
  CPC ............... *F02C 7/28* (2013.01); *F01D 25/16* (2013.01); *F01D 25/18* (2013.01); *F05D 2240/70* (2013.01); *F05D 2260/602* (2013.01); *F05D 2260/609* (2013.01)

(58) Field of Classification Search
  CPC .... F02C 3/064; F02C 7/20; F02C 7/28; F05D 2260/602; F05D 2260/6022
  See application file for complete search history.

(56) References Cited

OTHER PUBLICATIONS

French Search Report, dated Apr. 9, 2014, French Application No. 1355443.

\* cited by examiner

TRUNNION FOR HIGH-PRESSURE TURBINE, AND TURBOJET ENGINE INCLUDING SUCH A TRUNNION

FIELD OF THE INVENTION

The invention relates to a trunnion for high-pressure turbine, and a turbojet engine including such a trunnion.

PRIOR ART

The double-body turbojet engines comprise two rotating bodies: a low-pressure body and a high-pressure body, the rotations of which are independent. Each body includes a compressor and a turbine driving the compressor. For this purpose, each body also includes a shaft connecting the turbine to the compressor to drive the compressor in rotation.

The low-pressure turbine shaft connects the low-pressure compressor to the low-pressure turbine. The high-pressure compressor shaft connects the high-pressure compressor to the high-pressure turbine, In such a turbojet engine, the high-pressure compressor shaft concentrically extends around the low-pressure turbine shaft.

Also, the high-pressure compressor shaft comprises an end trunnion arranged at the level of the receiving end of the shaft (end connected to the high-pressure turbine). The function of the end trunnion is to support the bearing no. 4 arranged between the high-pressure compressor shaft and the low-pressure turbine shaft.

Lubrication of the bearing is assured by circulating of oil through the bearing. Due to the centrifugal effect produced by rotation of the high-pressure compressor shaft, the oil circulates through the bearing and is evacuated downstream of the turbojet engine in order to be recycled.

When such a turbojet engine is operating, the appearance of fumes is noticed.

SUMMARY OF THE INVENTION

An aim of the invention is to reduce the fumes produced when the turbojet engine starts up.

Investigations conducted by the inventors have revealed that the production of fumes was due to an accumulation of oil in some hot areas of the turbojet engine, this accumulation of oil originating from backflow of the oil upstream of the turbojet engine, occurring in particular when the turbojet engine is turning at low speed.

This problem is resolved within the scope of the present invention by way of a trunnion for a high-pressure turbine, intended to be disposed between a low-pressure turbine shaft and an inner surface of a seal support of a low-pressure turbine, the trunnion being characterized in that it comprises a drop-launching extension arranged to extend facing a flared portion of the inner surface of the seal support such that when the trunnion is driven in rotation around the low-pressure turbine shaft, oil tending to penetrate between the trunnion and the seal support is projected by centrifugal effect from the drop-launching extension towards the flared portion of the inner surface of the seal support.

The drop-launching extension projects oil circulating along the trunnion towards the flared portion of the inner surface of the seal support, before the oil has managed to penetrate between the trunnion and the seal support. This arrangement therefore limits any upwelling of the oil upstream of the turbojet engine.

The trunnion can further have the following characteristics:

the trunnion comprises a recess arranged in the outer surface of the trunnion, the recess stopping penetration of oil between the trunnion and the seal support and causing detachment of the oil towards the inner surface of the seal support by centrifugal effect, the recess is an annular groove arranged in the outer surface of the trunnion, the drop-launching extension has an outer surface tilted relative to an axis of rotation of the trunnion, tending to guide the oil towards the recess by centrifugal effect when the trunnion is driven in rotation, the trunnion comprises a series of radial flanges suitable for forming a sealing labyrinth between the trunnion and the seal support.

The invention also relates to a turbojet engine comprising a low-pressure compressor, a high-pressure compressor, a high-pressure turbine and a low-pressure turbine, the turbojet engine further comprising:

a low-pressure turbine shaft connecting the low-pressure compressor to the low-pressure turbine, a high-pressure compressor shaft extending around the low-pressure turbine shaft, and connecting the high-pressure compressor to the high-pressure turbine, wherein the low-pressure turbine comprises a seal support having an inner surface having a flared portion and the high-pressure compressor shaft comprises a trunnion such as defined previously, placed between the low-pressure turbine shaft and the inner surface of the seal support of the low-pressure turbine.

PRESENTATION OF DRAWINGS

Figure 2:
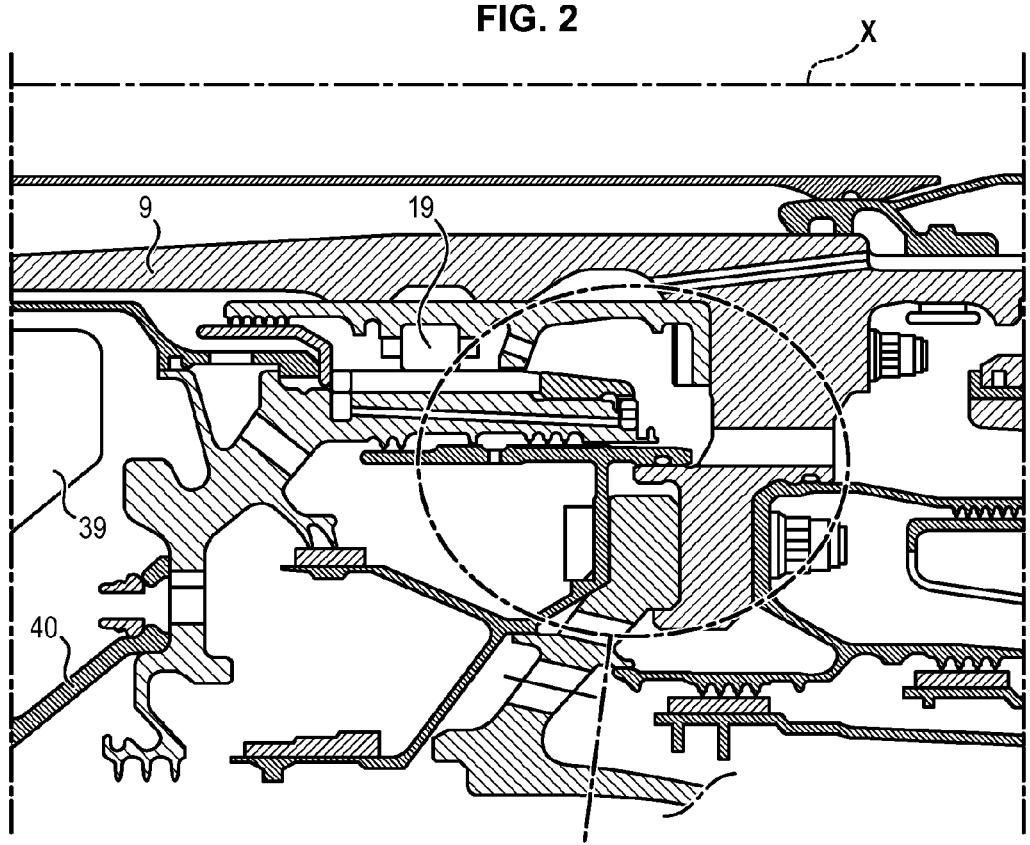
Figure 2:
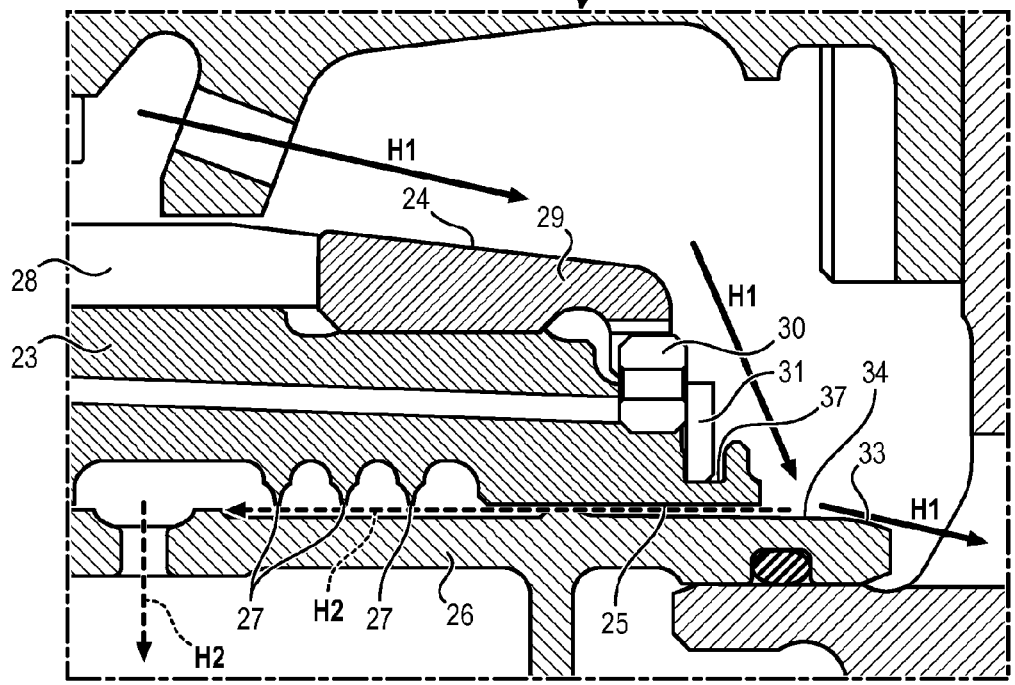
Figure 3:
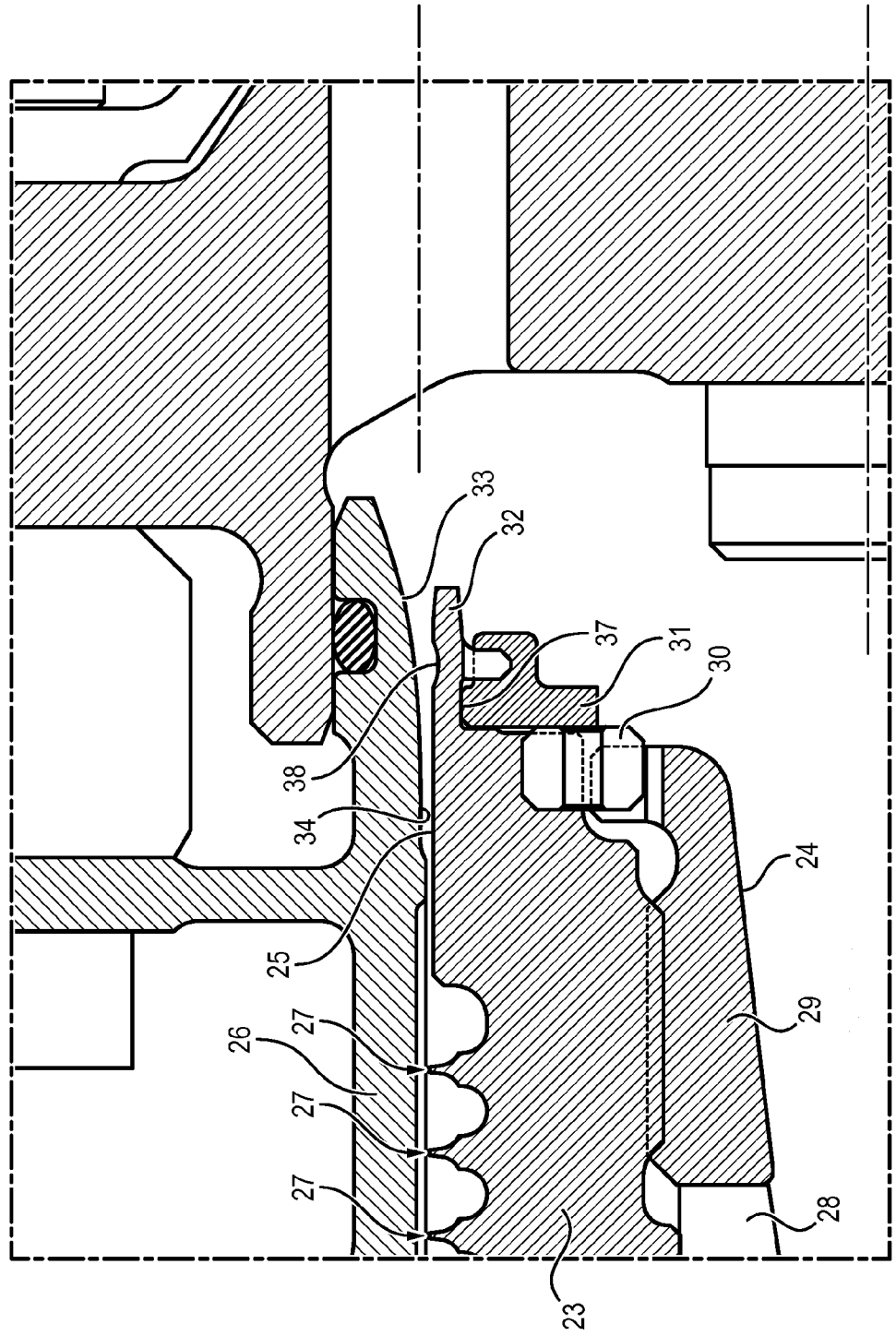
Figure 4:
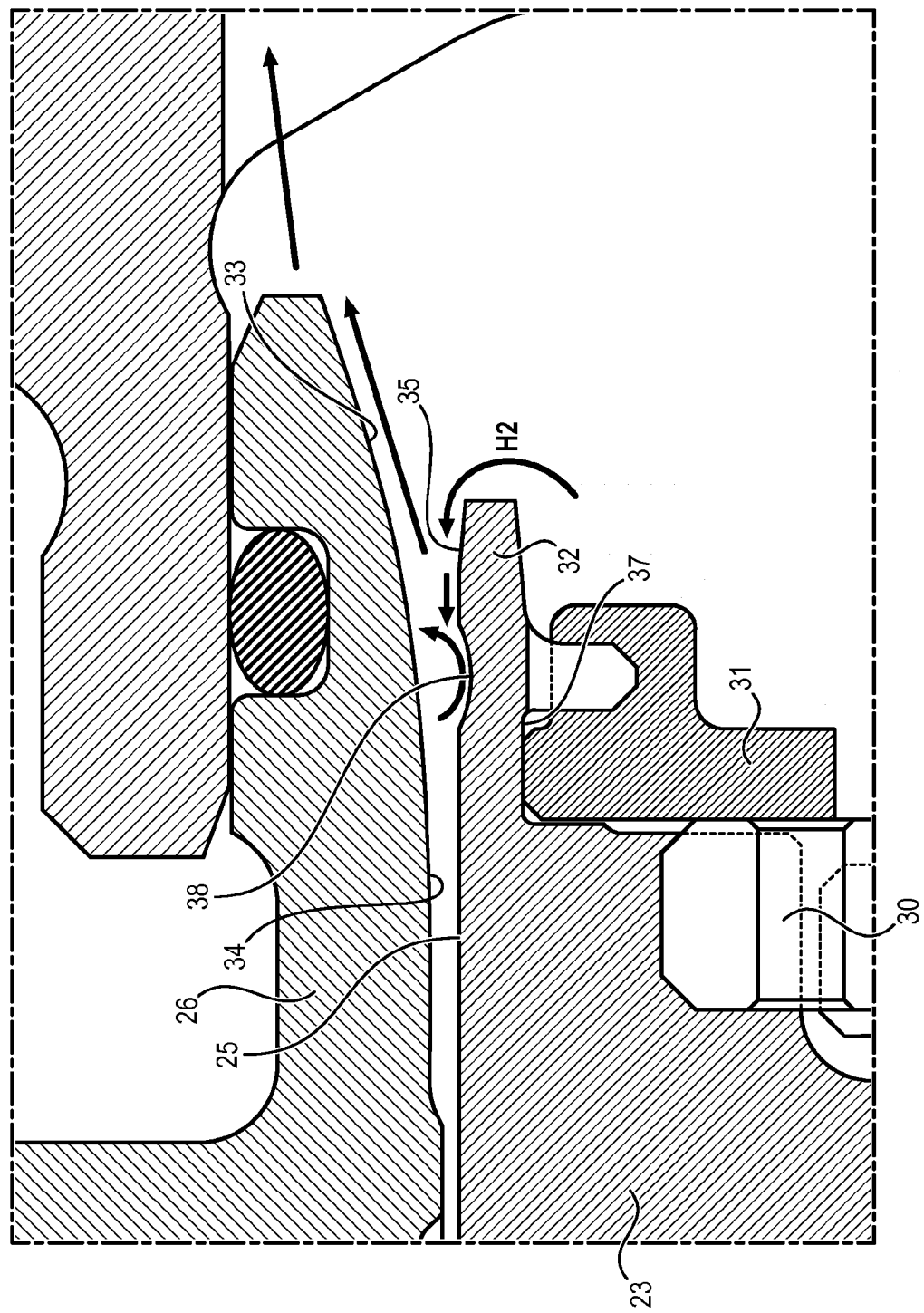

Other characteristics and advantages will emerge from the following description which is purely illustrative and non-limiting and must be considered with respect to the appended figures, in which:

FIG. 1 schematically illustrates, in longitudinal section, a double-body turbojet engine, FIG. 2 schematically illustrates circulation of oil for lubricating the bearing no. 4 in a turbojet engine comprising a conventional trunnion, FIGS. 3 and 4 schematically illustrate circulation of oil for lubricating the bearing no. 4 in a turbojet engine comprising a trunnion as per an embodiment of the invention.

DETAILED DESCRIPTION OF AN EMBODIMENT

In FIG. 1, the illustrated turbojet engine 1 comprises a casing 2, a fan 3, a low-pressure body 4, a high-pressure body 5 and a combustion chamber 6.

The low-pressure body 4 comprises a low-pressure compressor 7, a low-pressure turbine 8 and a low-pressure turbine shaft 9 connecting the low-pressure compressor 7 to the low-pressure turbine 8. The low-pressure turbine shaft 9 extends according to a longitudinal axis X of the turbojet engine 1. The low-pressure turbine 8 is capable of driving the low-pressure compressor 9 in rotation via the low-pressure turbine shaft 9. All of the low-pressure body 4 is then driven in rotation relative to the casing 2 around the axis X.

The high-pressure body 5 comprises a high-pressure compressor 10, a high-pressure turbine 11 and a high-pressure compressor shaft 12 connecting the high-pressure compressor 10 to the high-pressure turbine 11. The high-pressure compressor shaft 12 extends around the low-pressure turbine shaft 9 concentrically to the latter (that is, centered on the axis X). The high-pressure turbine 11 is capable of driving the high-pressure compressor 12 in rotation via the high-pressure compressor shaft 12. All of the high-pressure body 5 is then driven in rotation relative to the casing 2 around the axis X.

When operating, the low-pressure 4 and high-pressure 5 bodies are driven in rotation relative to the casing 2 independently of each other. In this way, the turbine shaft 9 and the compressor shaft 12 are driven in rotation independently of each other around the longitudinal axis X of the turbojet engine 1.

When the turbojet engine 1 is operating, air 13 is aspirated by the fan 3 and is divided into primary airflow 14 and secondary airflow 15, which circulate from upstream to downstream of the turbojet engine 1.

The primary airflow 14 flows through the turbojet engine 1 from upstream to downstream passing successively through the low-pressure compressor 7, the high-pressure compressor 10, the combustion chamber 6 where it is mixed with fuel to be burnt, the high-pressure turbine 11 and the low-pressure turbine 8. Passage of the primary airflow 14 through the high-pressure turbine 11 and the low-pressure turbine 8 causes rotation of the turbines 11 and 8 which in turn drive the high-pressure compressor 10 and the low-pressure compressor 7, as well as the fan 3, in rotation via the turbine shaft 9 and the compressor shaft 12.

The shafts 9 and 12 are supported and guided in rotation by bearings 16, 17, 18 and 19 which are housed in pressurised bearing chambers.

Therefore, the first bearing 16 and the second bearing 17 (respectively called "bearings no. 1" and "bearing no. 2") are interposed between a disc support 20 of the low-pressure compressor and the casing 2 of the turbojet engine.

The third bearing 18 (called "bearing no. 3") is arranged at a first end 21 of the high-pressure compressor shaft 12, the first end 21 being connected to the high-pressure turbine 10. The third bearing 18 is interposed between the high-pressure compressor shaft 12 and the casing 2.

The fourth bearing 19 (called "bearing no. 4") is disposed at a second end 22 of the high-pressure compressor shaft 12, the second end 22 being connected to the high-pressure compressor 11. The fourth bearing 19 is interposed between the high-pressure compressor shaft 12 and the low-pressure turbine shaft 9.

In FIG. 2, the high-pressure compressor shaft 12 comprises a conventional end trunnion 23 at the level of its second end 22. The bearing 19 is interposed between the low-pressure turbine shaft 9 and the trunnion 23 of the high-pressure compressor shaft 12.

The trunnion 23 is fixed to the disc 39 of the high-pressure turbine 10 by means of a bolted flange 40. In other words, the trunnion 23 is secured in rotation to the high-pressure compressor shaft 12 by way of the flange 40.

Also, the outer ring 28 of the bearing 19 is fixed on the trunnion by way of a nut 29 (called "bearing nut no. 4"), a pin 30 and a circlip 31 held in an annular groove 37 of the trunnion 23.

The assembly of trunnion 23+disc 39+outer ring 28+nut 29 presents an inner surface 24 extending facing the low-pressure turbine shaft 9.

The inner surface 24 is flared downstream of the turbojet engine 1 so as to guide the oil H1 circulating along its inner surface 24 downstream of the turbojet engine by centrifugal effect when the high-pressure compressor shaft 12 is driven in rotation. The oil H1 for lubricating the bearing 19 is then evacuated towards the bearing chamber to be recycled.

Also, the trunnion 23 has an outer surface 25 extending facing an inner surface 34 of the seal support 26 of the low-pressure turbine 8.

The outer surface 25 of the trunnion 23 comprises a series of radial flanges 27 forming a sealing labyrinth between the trunnion 23 and the seal support 26 of the low-pressure turbine 8.

Also, air is injected in between the outer surface 25 of the trunnion and the inner surface 34 of the seal support to keep the bearing chamber of the bearing 19 under pressure.

The seal support 26 of the low-pressure turbine 8 also has an inner surface 34 having a flared portion 33 downstream of the turbojet engine 1 so as to guide the oil H1 circulating along its inner surface 34 downstream of the turbojet engine by centrifugal effect.

As is illustrated in FIG. 2, it has been noted that when the high-pressure shaft 12 is driven in rotation around the axis X, oil H2 can penetrate between the trunnion 23 and the seal support 26 by rising along the seal support 26 downstream of the turbojet engine 1. The oil H2 can then infiltrate hot parts of the turbojet engine 1 and cause the appearance of unwanted fumes. This phenomenon has been noted in particular when the turbojet engine 1 is operating at low speed, and the centrifugal effect is inadequate for countering penetration of the oil H2 between the trunnion 23 and the seal support 26.

In FIGS. 3 and 4 the high-pressure compressor shaft 12 comprises an end trunnion 23 according to an embodiment of the invention.

The bearing 19 is interposed between the low-pressure turbine shaft 9 and the trunnion 23 of the high-pressure compressor shaft 12.

The trunnion 23 shown in FIGS. 3 and 4 differs from the trunnion 23 of FIG. 2 in that it comprises a drop-launching extension 32 extending facing the flared portion 33 of the inner surface 34 of the seal support 26.

The drop-launching extension 32 extends beyond the annular groove 37 arranged in the trunnion 23 to receive the circlip 31.

In this way, when the trunnion 23 is driven in rotation around the low-pressure turbine shaft 9, oil H2 tending to penetrate between the outer surface 25 of the trunnion 23 and the inner surface 34 of the seal support 26 is projected by centrifugal effect from the drop-launching extension 32 towards the flared portion 33 of the inner surface 34 of the seal support 26.

Oil H2 is then guided, by centrifugal effect, along the inner surface 33 of the seal support downstream of the turbojet engine 1 to be recycled.

Also, the trunnion 23 comprises a recess 38 arranged in the outer surface 25 of the trunnion, the recess 38 being made in the form of an annular groove.

The annular groove 38 stops penetration of the oil H2 between the outer surface 25 of the trunnion 23 and the inner surface 34 of the seal support 26 by causing detachment of the oil towards the flared portion 33 of the inner surface 34 of the seal support 26 by centrifugal effect.

Also, the drop-launching extension 32 has an outer surface 35 tilted relative to the axis of rotation X of the high-pressure compressor shaft 12. The inclination of the outer surface 35 is such that the outer surface 35 tends to guide the oil H2 towards the recess 38 by centrifugal effect when the trunnion 23 is driven in rotation.

Finally, the trunnion 23 comprises a series of radial flanges 27 forming a sealing labyrinth between the outer surface 25 of the trunnion 23 and the inner surface 34 of the seal support 26.

The invention claimed is:

1. A trunnion for high-pressure turbine, intended to be arranged between a low-pressure turbine shaft and an inner surface of a seal support of a low-pressure turbine, the trunnion comprising a drop-launching extension extending facing a flared portion of the inner surface of the seal support, such that when the trunnion is driven in rotation around the low-pressure turbine shaft, oil is projected by centrifugal effect from the drop-launching extension towards the flared portion of the inner surface of the seal support, the trunnion further comprising a recess arranged in an outer surface of the trunnion, the recess stopping penetration of the oil between the trunnion and the seal support and causing detachment of the oil towards the inner surface of the seal support by centrifugal effect, wherein the drop-launching extension has an outer surface tilted relative to an axis of rotation of the trunnion, to guide the oil towards the recess by centrifugal effect when the trunnion is driven in rotation.

2. The trunnion according to claim 1, wherein the recess is an annular groove arranged in the outer surface of the trunnion.

3. The trunnion according claim 1, comprising a series of radial flanges forming a sealing labyrinth between the trunnion and the seal support.

4. A turbojet engine comprising a low-pressure compressor, a high-pressure compressor, a high-pressure turbine and a low-pressure turbine, the turbojet engine further comprising:

a low-pressure turbine shaft connecting the low-pressure compressor to the low-pressure turbine, a high-pressure compressor shaft extending around the low-pressure turbine shaft, and connecting the high-pressure compressor to the high-pressure turbine, wherein the low-pressure turbine comprises a seal support presenting an inner surface having a flared portion and the high-pressure turbine comprises a trunnion, disposed between the low-pressure turbine shaft and the inner surface of the seal support of the low-pressure turbine, wherein said trunnion is disposed between the low-pressure turbine shaft and an inner surface of a seal support of the low-pressure turbine, the trunnion including a drop-launching extension extending facing a flared portion of the inner surface of the seal support, such that when the trunnion is driven in rotation around the low-pressure turbine shaft, oil is projected by centrifugal effect from the drop-launching extension towards the flared portion of the inner surface of the seal support, the trunnion further comprising a recess arranged in an outer surface of the trunnion, the recess stopping penetration of the oil between the trunnion and the seal support and causing detachment of the oil towards the inner surface of the seal support by centrifugal effect, wherein the drop-launching extension has an outer surface tilted relative to an axis of rotation of the trunnion, to guide the oil towards the recess by centrifugal effect when the trunnion is driven in rotation.

* * * * *